United States Patent
Döbele et al.

(10) Patent No.: US 6,939,267 B2
(45) Date of Patent: Sep. 6, 2005

(54) METHOD FOR CONTROLLING GEAR DEFINITION IN AN AUTOMATED STEPPED GEARBOX

(75) Inventors: Bernd Döbele, Salem (DE); Norbert Wiencek, Hagnau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 13 days.

(21) Appl. No.: 10/481,094
(22) PCT Filed: Jun. 29, 2002
(86) PCT No.: PCT/EP02/07200

§ 371 (c)(1),
(2), (4) Date: Dec. 17, 2003

(87) PCT Pub. No.: WO03/004300
PCT Pub. Date: Jan. 16, 2003

(65) Prior Publication Data
US 2004/0192497 A1 Sep. 30, 2004

(30) Foreign Application Priority Data
Jul. 5, 2001 (DE) .......................... 101 32 738

(51) Int. Cl.$^7$ .......................... F16H 59/48; B60K 41/02; G06F 17/00; G06F 19/00; G06F 7/00
(52) U.S. Cl. .......................... 477/120; 477/174; 701/53; 701/67
(58) Field of Search ................................ 477/120, 121, 477/174, 904; 701/53, 58, 64, 67

(56) References Cited

U.S. PATENT DOCUMENTS

| 4,324,322 A | | 4/1982 | Sibeud .................... 192/0.032 |
| 5,121,657 A | * | 6/1992 | Asada .......................... 477/120 |
| 5,315,514 A | * | 5/1994 | Steeby et al. .................. 701/52 |
| 5,531,654 A | * | 7/1996 | Ishikawa et al. ............. 477/120 |
| 5,555,170 A | * | 9/1996 | Nakashima ................... 701/57 |
| 5,730,682 A | | 3/1998 | Depping et al. ............. 477/120 |
| 5,995,896 A | | 11/1999 | Depping et al. .............. 701/51 |
| 2002/0049118 A1 | | 4/2002 | Vornehm et al. ............. 477/107 |

FOREIGN PATENT DOCUMENTS

| DE | 195 16 948 A1 | 11/1996 | .......... F16H/59/48 |
| DE | 196 38 064 A1 | 3/1998 | .......... F16H/59/48 |
| DE | 198 02 736 A1 | 7/1999 | .......... B60K/41/28 |
| DE | 199 54 552 A1 | 5/2000 | .......... F16H/63/50 |
| EP | 0 390 423 A1 | 10/1990 | .......... B60K/41/28 |

* cited by examiner

*Primary Examiner*—Tisha Lewis
(74) *Attorney, Agent, or Firm*—Davis & Bujold, P.L.L.C.

(57) ABSTRACT

A method for controlling the gear release in an automated multi-speed drive in a vehicle drive with a drive motor and a separating clutch positioned between the drive motor and the multi-speed drive that the events "application of a shifting power" and "opening of the separating clutch" are determined dependent on reaching certain vehicle accelerations ($a_{gear\_release}$, $a_{clutch\_engage}$). The vehicle acceleration ($a_{veh}$) decreases at the beginning of the shifting process due to the reduction of the fuel injection quantity (EM) supplied to the drive motor.

2 Claims, 2 Drawing Sheets

METHOD FOR CONTROLLING GEAR DEFINITION IN AN AUTOMATED STEPPED GEARBOX

This application is a national stage completion of PCT/EP02/07200 filed Jun. 29. 2002 which claims priority from German Application Serial No.101 32 738.2 dated Jul. 5, 2001.

FIELD OF THE INVENTION

The invention concerns a method for controlling the gear release in an automated multi-speed drive for motor vehicles.

BACKGROUND OF THE INVENTION

A system-dependent tractive force interruption takes place when shifting gears in automatic multi-speed drives. Normally the following processes take place when shifting a gear:
  reduction of the torque transferred from the drive motor
  engaging of the separating clutch
  release of the old gear
  engagement of the new gear
  disengaging of the separating clutch
  increase of the transferred torque by an amount that corresponds to the appropriate pedal position.

Shifting should take place quickly especially in the case of high tractive power requirements, such as in inclinations in order to avoid a slow-down of the vehicle during shifting. In addition, comfort criteria must be maintained and the load of the shift elements must remain within certain limits. Depending on the driving situation, a different time sequence is necessary for the process steps, so that the shift period, comfort, and load criteria can be maintained.

DE 198 02 736 A1 discloses a method where the speed of the torque decrease at the start of the shifting process and of the torque increase at the end of the shifting process is determined depending on the vehicle acceleration and the gas pedal angle. According to this known method, the clutch is engaged and the gear is released at the end of the ramp with which the torque is reduced. In certain driving situations, the timing for engaging the clutch is too early or too late compared with an optimal shifting operation.

The present invention is based on the task of developing a method for controlling the gear release where the time sequence of the process steps while releasing the gear can be optimized in a simple fashion.

This problem is solved according to the inventive method. Accordingly, the steps—application of a shift load for decoupling the shift elements and opening the separating clutch—are triggered at that point when the vehicle acceleration, which is continuously determined at each program step, reaches an assigned vehicle acceleration value. During the start of the shifting process the current initial acceleration of the vehicle is determined and stored in the memory of the electronic control system. Then the torque of the drive motor is continuously reduced by lowering the injected fuel quantity supplied by the fuel injection pump. At the beginning of the shift, a first and second vehicle acceleration value is determined dependent on the starting acceleration of the vehicle, the injected fuel quantity that is supplied to the drive motor and the engaged gear. The current vehicle acceleration is constantly compared with the first and the second vehicle acceleration values. As soon as the current vehicle acceleration reaches or falls below the first vehicle acceleration value, the actuator is applied with a shift power for the shift elements to be decoupled, so that consequently the gear is released.

SUMMARY OF THE INVENTION

The current vehicle acceleration is also constantly compared with the second vehicle acceleration value. As soon as it reaches or falls below the second vehicle acceleration value, the clutch actuator will engage the clutch. This can take place after the application of the shift power to the shift elements that are to be decoupled, especially with high starting acceleration values. As the first and the second vehicle acceleration values are determined independently from each other, it is also conceivable that the value reaches or falls below the second vehicle acceleration value first. In this case, however, the shift power is applied also to the actuator for the shift elements that are to be decoupled at the latest now because the transferred torque in the drive is so small that the shift power applied by the actuator is sufficient for decoupling the shift power elements.

The determined vehicle acceleration which, for example, can be measured or calculated by deducing a speed value, is a very good indicator for the actual torque that is transferred by the drive at any moment. As the state of the vehicle is extremely transient during shifting other methods that depend on the motor load often deliver results that are offset in time. The first and second vehicle acceleration values are dependent on the fuel injection quantity supplied to the drive motor and on the engaged gear or on the gear range in maps that had been stored in the memory of the electronic control system, which is accessed with each program run.

In an advantageous design of the invention, the torque transferred from the drive motor is reduced with a speed that depends on the starting acceleration of the vehicle and on the applied gas pedal position at the start of the shifting process.

BRIEF DESCRIPTION OF THE DRAWINGS

The invention will now be described, by way of example, with reference to the accompanying drawings in which.

DETAILED DESCRIPTION OF THE INVENTION

A method step 2 presents the start of the shift at the time $t_0$, showing a status just before the shifting process. At method step 4 at the time $t_0$, the current initial vehicle acceleration $a_{start}$ is determined at the start of the shifting process. It is the same as the current vehicle acceleration $a_{veh}(t_0)$. In method steps 6 and 8, the two vehicle acceleration values $a_{clutch\_engage}$ and $a_{clutch\_release}$ are determined. The values for these vehicle accelerations depend on the initial vehicle acceleration $a_{start}$, the fuel injection quantity EM that is supplied to the drive motor and the engaged actual gear in the maps of the electronic control system. The two vehicle acceleration values $a_{clutch\_engage}$ and $a_{clutch\_release}$ are stored in the electronic control system and are subsequently constantly—that is at every program run—compared with the current vehicle acceleration $a_{veh}$. The current vehicle acceleration then decreases continuously due to the reduction of torque by the drive motor. The speed dM/dt with which the torque that is supplied by the drive motor is reduced is a function of the initial vehicle acceleration $a_{start}$, and the gas pedal position FP (see program step 10). During the following program step 12, the current vehicle acceleration $a_{veh}$ is compared with the vehicle acceleration value $a_{gear\_release}$. If the current vehicle acceleration $a_{veh}$ is smaller than or equal to the vehicle acceleration value $a_{gear\_release}$ a command is triggered in program step 14 causing the shift elements that are to be decoupled to be supplied with the shift power by the actuator. As soon as the torque on the shift elements is small enough, the shift elements to be decoupled are released due to the applied shift power and the gear is released. The program step 16 will run a cycle until the current vehicle acceleration value $a_{veh}$ drops also below the second vehicle acceleration value $a_{clutch\_release}$ until the separating clutch is engaged in program step 18, ending the gear release in program step 20.

As long as none of the two vehicle acceleration values $a_{gear\_release}$ and $a_{clutch\_engage}$ is reached or falls below it, the scanning is repeated in a loop in program steps 12 and 22. If the current vehicle acceleration value $a_{veh}$ drops below the vehicle acceleration value $a_{clutch\_engage}$ the separating clutch is opened on program step 24 and immediately thereafter the actuator is applied with a shift power for the shift elements to be decoupled, which ends the function.

Figure 1:
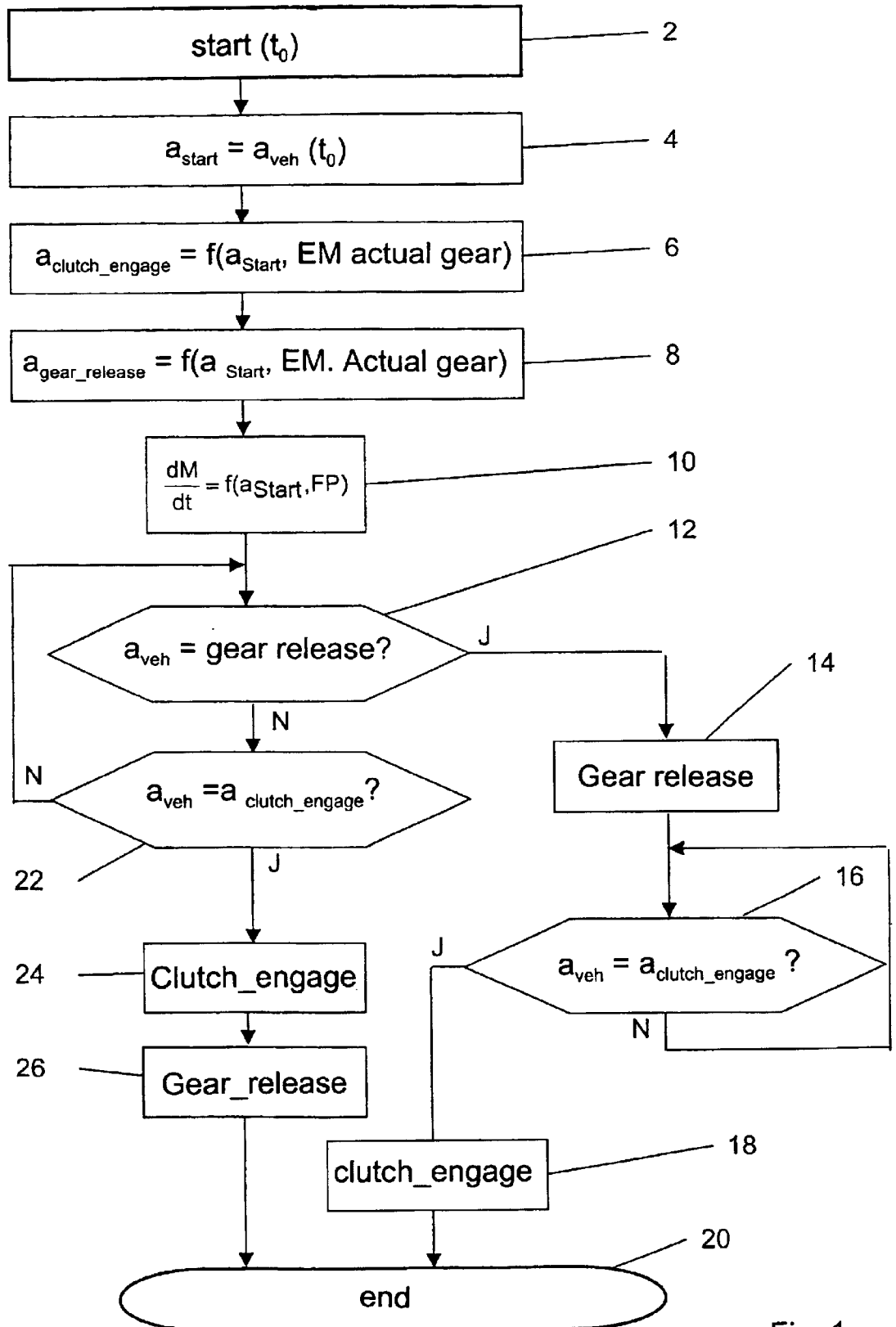
FIG. 1 shows a flow chart of the method according to the invention.
Figure 2:
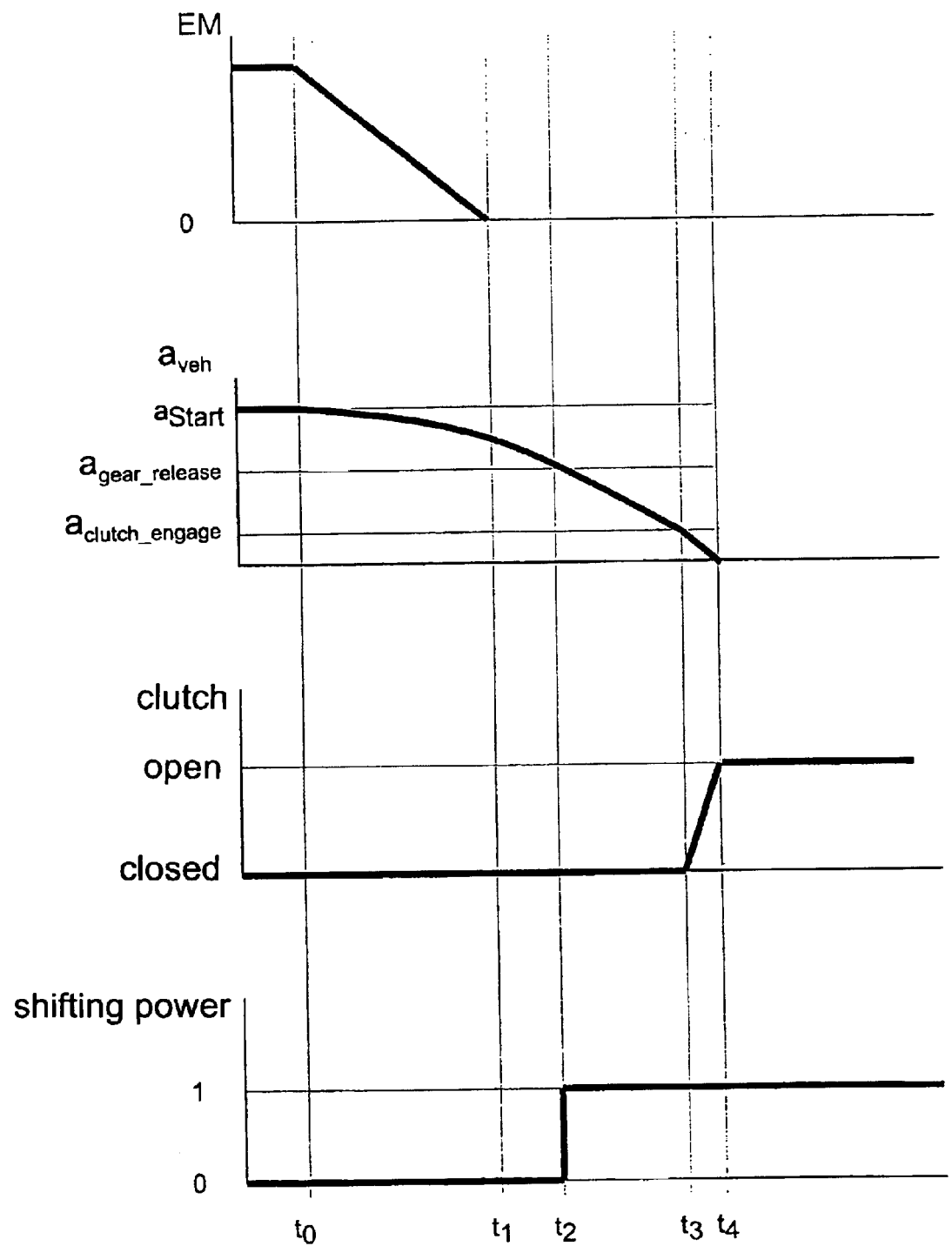
FIG. 2 shows the time sequence of the gear release.

FIG. 2 shows the time sequence of the method steps according to the invention. The chronological course of the fuel injected quantity EM is shown in the upper part of the diagram. The reduction of the fuel injected quantity starts after the shift command at the time $t_0$ causing the torque reduction of the drive motor. The increase at which the fuel injected quantity is reduced during the time period $t_0$ to $t_1$ is a measure for the speed dM/dt of the torque reduction by the drive motor. This speed depends on the initial vehicle acceleration $a_{start}$ and the gas pedal position FP at the time of $t_0$. The speed of the reduction in torque by the drive motor is greater the greater the initial vehicle acceleration and the greater the initial gas pedal position is.

The course of the vehicle acceleration $a_{veh}$ is shown in the second partial diagram. The current vehicle acceleration at the time $t_0$ is the initial vehicle acceleration $a_{start}$, which is used for determining the vehicle acceleration values $a_{gear\_release}$ and $a_{clutch\_engage}$. The current vehicle acceleration $a_{veh}$ is reduced as a consequence to the reduction in the fuel injected quantity at a time delay. The time delay results partially from the time-delayed reaction of the drive motor. In addition, there are several components in the drive train, especially the long universal joint shafts that deform elastically under load. The stored energy herein also decreases only slowly with the torque reduction by the drive motor.

The current vehicle acceleration $a_{veh}$ reaches the vehicle acceleration value $a_{gear\_release}$ at the time $t_2$. It can be seen in the bottom partial diagram of FIG. 2 that the shift elements to be decoupled are applied with a shift power at this time.

The current vehicle acceleration $a_{veh}$ reaches the vehicle acceleration value $a_{clutch\_engage}$ at the time $t_3$. It can be seen in the third partial diagram of FIG. 2 that the clutch plate starts to engage the clutch at that time. The clutch is finally engaged at the time $t_4$. At the latest at that point in time, the shift elements do not transfer any torque to the shift elements to be decoupled causing them to be decoupled with a low shift power. The decoupling of the shift elements can, however, take place already before engaging the clutch if the torque has an appropriate small value due to the reduction of the fuel injected quantity.

According to the invention, the events "application of the shift elements to be decoupled with a shift power" and "opening of the clutch" do not always take place in the same given sequence. The vehicle acceleration values that trigger those events are determined independently from each other at the beginning of the shifting process. The coordination is significantly simplified as the values are determined at first independently from each other for different driving situations.

What is claimed is:

1. A method for controlling a gear release in an automated multi-speed drive in a vehicle drive having a drive motor and a separating clutch, that is positioned between the drive motor and separating clutch and that can be optionally opened or closed by a clutch plate whereby a torque of the drive motor is reduced at a start of a shifting process so that shift elements to be decoupled during the gear release can be decoupled by an actuator with little shift power and the torque of the drive motor is not increased involuntarily by engaging the clutch, comprising the steps of:

continuously determining a current vehicle acceleration ($a_{veh}$);

determining a current initial vehicle acceleration ($a_{start}$) at the start of the shifting process;

determining a first and second vehicle acceleration value ($a_{gear\_release}$, $a_{clutch\_engage}$), dependent on the initial vehicle acceleration ($a_{start}$), a fuel injection quantity EM supplied to the drive motor and the selected actual gear;

constantly comparing the current vehicle acceleration ($a_{veh}$) with the first and the second vehicle acceleration values ($a_{gear\_release}$, $a_{clutch\_engage}$);

applying a shift force from the actuator on the shift elements to be decoupled when the current vehicle acceleration ($a_{veh}$) reaches the first acceleration value ($a_{gear\_release}$) or drops below it; and opening the clutch with the clutch plate when the current vehicle acceleration value ($a_{veh}$) reaches or drops below the second vehicle acceleration value ($a_{clutch\_engage}$) whereby at the latest the actuator applies a shift power to the shift elements to be decoupled.

2. The method according to claim 1, further comprising the step of reducing the torque of the drive motor with a speed that depends on the initial vehicle acceleration ($a_{start}$) and a gas pedal position (FP) at the time ($t_0$).

* * * * *